H. L. TURNEY.
LOGGING ENGINE.
APPLICATION FILED AUG. 14, 1911.

1,038,029.

Patented Sept. 10, 1912.
2 SHEETS—SHEET 1.

Witnesses

Harry L. Turney, Inventor
by C. A. Snow & Co.
Attorneys

H. L. TURNEY.
LOGGING ENGINE.
APPLICATION FILED AUG. 14, 1911.

1,038,029.

Patented Sept. 10, 1912.
2 SHEETS—SHEET 2.

Witnesses

Harry L. Turney, Inventor by C. A. Snow & Co.
Attorneys

UNITED STATES PATENT OFFICE.

HARRY LEON TURNEY, OF PORTLAND, OREGON.

LOGGING-ENGINE.

1,038,029.  Specification of Letters Patent.  Patented Sept. 10, 1912.

Application filed August 14, 1911. Serial No. 644,029.

*To all whom it may concern:*

Be it known that I, HARRY L. TURNEY, a citizen of the United States, residing at Portland, in the county of Multnomah and State of Oregon, have invented a new and useful Logging-Engine, of which the following is a specification.

This invention relates to an improvement in logging engines.

The primary object of this invention is to provide simple and efficient means for varying the speed of the hoisting drum.

A further object of the invention is to provide means for normally holding the driving gears out of contact with the drum.

Figure 1:
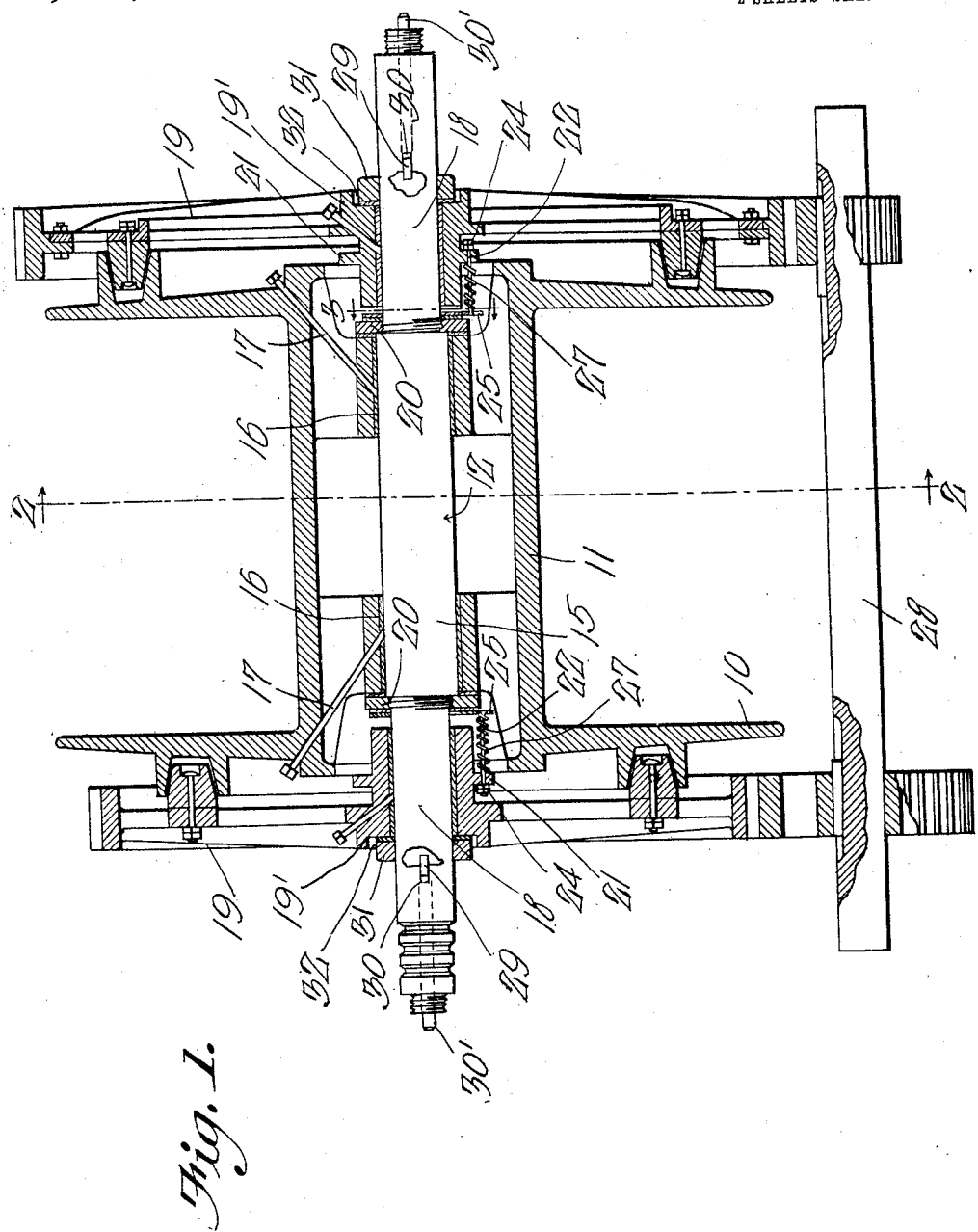
Figure 2:
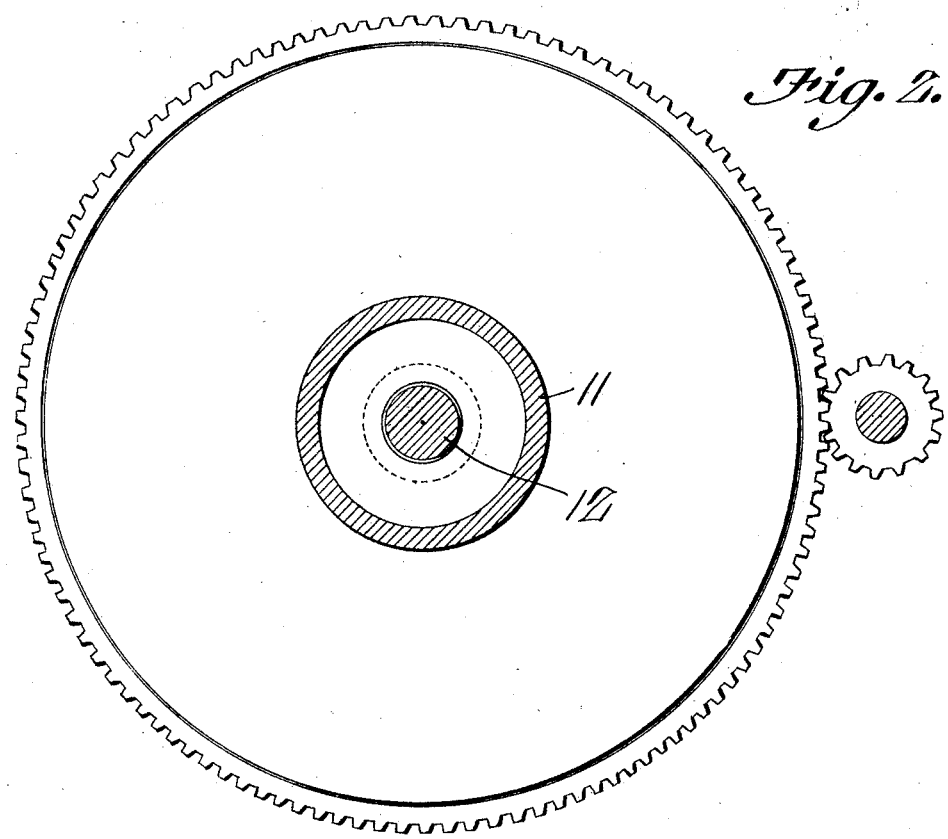
Figure 3:
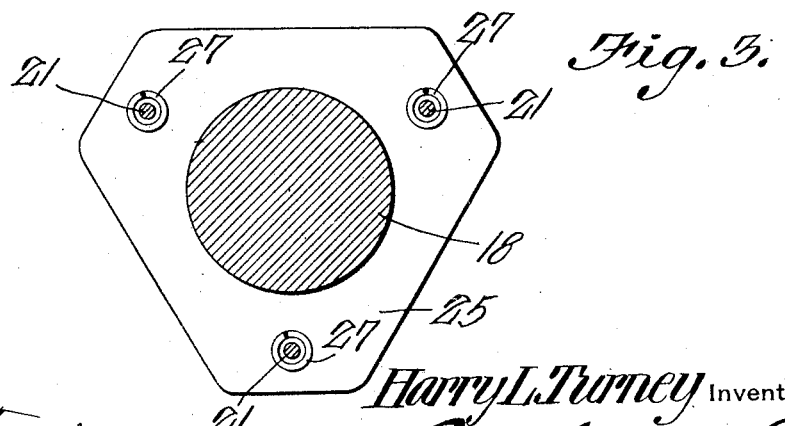

In the drawings;—Figure 1 is a longitudinal section. Fig. 2 is a section on the line 2—2 of Fig. 1. Fig. 3 is a detail view of one of the plates which is supported to rotate with the driving gear.

In the drawings, 10 designates the winding drum which is formed with the hub portion 11 supported to rotate on shaft 12, the hub being formed with bearings 14 which embrace the centrally enlarged portion 15 of the shaft 12, a babbitt insert 16 being arranged between said bearings and said shaft, oil being supplied to the shaft by means of the tube 17. Mounted for free rotation on the reduced end 18 of the shaft 12 are the drive wheels 19, the hub portions 19' of said wheels extending within the hub portion of the winding drum 10, the end portions of the hub portions 19' being spaced from the bearings 14 of the drum. The shaft 12 is screw threaded adjacent the bearings 14 and receives a collar 20, a babbitt insert spacing said collar from the end portion of the bearing 14, these collars preventing the drum from moving endwise on the shaft. The hub portions of the drive wheels 19 are each provided with apertured lugs 21 which support the end portions of the rods 22, these lugs being three in number, the rods being provided with stops 24 which limit their movement toward the drum. A triangular plate 25 is freely mounted on the shaft 12 and the rods 24 are each secured to one of the corners of said plate, said plate contacting with the collar which lies adjacent the hub portion 16, a spring 27 being coiled around each of the rods, said springs spacing the gear wheel 19 from the plate, thus resiliently supporting the gear wheel 19 which is adapted for engagement with the drum to rotate the same.

The gears 19 are in mesh with gears of different diameter mounted on a drive shaft 28, one of said gears being driven at a higher rate of speed than the other, the gears being alternately brought into frictional engagement with the drum in order to vary the speed of the same. The shaft 12 is bored to receive the pins 30' which, when reciprocated move the cross keys 29 which are movable in slots 30. These cross keys contact with collars 31 and are housed within the countersunk portion 32 of the hub 19'. The rods 30' are actuated by means (not shown), by means of which the same may be reciprocated from either side of the drum.

It will be noted from the foregoing that when the rods are shifted as shown in Fig. 1, the key on the left hand side of the drum will through its contact with the collar 31 force the adjacent gear wheel 19 into frictional engagement with the drum, this same movement which forces one gear wheel into engagement with the drum, releasing the gear wheel arranged on the opposite side of the drum, the movement of the other collar permitting the coiled springs to space said gear wheel and the plate which rotates with the same, said plate contacting with the collar which supports the drum against movement on the shaft. It will thus be noted that as one of the gear wheels 19 is thrown in frictional engagement with the drum to rotate the same, the other is simultaneously brought out of contact with said drum, the wheel which is brought out of contact with the drum being held out of contact by means of the springs 27.

The many advantages of a construction of this character will be clearly apparent as it will be noted that the peculiar mounting of the drum allows the same to rotate freely when unwinding, the drum being so mounted on the shaft as to prevent friction.

Particular attention is called to the manner of spacing the gear wheels from the drum and the peculiar manner of supporting said gear wheels in order that the same may freely rotate when not in contact with said drum.

What is claimed is:—

In a logging engine, a shaft, a drum loosely mounted on said shaft, said drum being formed with spaced bearings, the end portions of said shaft being reduced, a collar secured on each of said reduced portions, said collar contacting with the shoulder formed by reducing said shaft and with the bearings carried by said drum, a gear wheel loosely mounted adjacent each end of said shaft, each of said gear wheels being capable of frictional contact with said drum to rotate the same, a plurality of apertured lugs carried by each of said gear wheels, a rod supported by each of said lugs, said rods being free to move within the aperture formed therein, a plate loosely mounted on said shaft adjacent each of said gear wheels, said rods being connected to said plate, and resilient means for normally spacing said plate and said gear wheels.

In testimony that I claim the foregoing as my own, I have hereto affixed my signature in the presence of two witnesses.

HARRY LEON TURNEY.

Witnesses:
 GEORGE A. NEWCOMB,
 JAMES E. STRUMQUIST.